US006904565B1

(12) United States Patent
Lentz

(10) Patent No.: US 6,904,565 B1
(45) Date of Patent: Jun. 7, 2005

(54) GRAPHICAL CONTROL SYSTEM, METHOD, AND PRODUCT FOR TASK NAVIGATION

(75) Inventor: James Lee Lentz, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 711 days.

(21) Appl. No.: 09/422,365

(22) Filed: Oct. 21, 1999

(51) Int. Cl.[7] .................................................. G09G 5/00
(52) U.S. Cl. ...................... 715/705; 715/762; 715/764; 715/788; 715/763; 715/708; 715/804
(58) Field of Search ................................. 345/336, 333, 345/339, 342, 763, 762, 708, 804, 705, 764, 788; 717/1, 3

(56) References Cited

U.S. PATENT DOCUMENTS 6,298,474 B1 * 10/2001 Blowers et al. ................. 717/1
6,300,950 B1 * 10/2001 Clark et al. .................. 345/336
6,330,713 B1 * 12/2001 Sakamoto et al. ............. 717/3
6,337,696 B1 * 1/2002 Lindhorst et al. ........... 345/763

* cited by examiner

Primary Examiner—Ba Huynh
Assistant Examiner—Mylinh Tran
(74) Attorney, Agent, or Firm—Winstead Sechrest & Minick P.C.; Diana L. Roberts-Gerhardt

(57) ABSTRACT

The present invention relates in general to graphical user interfaces (GUI) in computer display systems, and in particular, to the instrumentation of graphical control for task navigation in a GUI system. The present invention provides a method, apparatus, and processing system for performing a step-by-step procedure using a task oriented interface integrated into a single, intuitive, graphical control/display that further controls the user's ability to navigate through the steps and prevents the user from attempting to revise irreversible steps. The interface display graphically displays how many steps remain to be completed, and how many steps have already been completed. Additionally, it enables the user to deviate from the predefined order of steps and skip optional steps while compelling the user to complete the required steps. The display also differentially displays the completed steps to indicate which steps can be revised and which cannot.

51 Claims, 8 Drawing Sheets

GRAPHICAL CONTROL SYSTEM, METHOD, AND PRODUCT FOR TASK NAVIGATION

The present invention relates in general to graphical user interfaces (GUI) in computer display systems, and in particular, to the instrumentation of graphical control for task navigation in a GUI system.

BACKGROUND INFORMATION

In GUI systems, task orientation interfaces (such as Microsoft Corp.'s "Wizards" or IBM Corp.'s "TaskGuides") can be used when step-by-step procedures are needed. For instance, U.S. Pat. No. 5,924,101 to Bach et al. ("Bach," which is incorporated herein) discloses a method, apparatus, and article of manufacture for generating class definitions and implementations for database persistent objects, wherein a task orientation interface is used that comprises a step-by-step procedure for creating the class specifications for the database persistent objects. Task oriented interfaces, such as Wizards and TaskGuides, include controls, such as buttons, for advancing the user forward (and backward) through the series of steps in the particular task. Such buttons are generally referred to as "Back" and "Forward" buttons. These buttons may be enabled or disabled to control user access to subsequent or previous tasks. Some Wizard-like interfaces have provided indications of where the user is in a task-sequence by using text. (For example by displaying "Step 2 of 4").

While the art has separately recognized the need and advantageous for such types of characteristics in task oriented interfaces, the amount of display space required was substantial and it would be cumbersome and confusing to supply all of these characteristics in a single display, especially in combination with other types of characteristics for task oriented interfaces. Accordingly, there is a need in the art for a simple task oriented interface that has such types of characteristics.

Furthermore, there is a need in the art for a more versatile task oriented interface that allows the user to perform a task by moving about the task sequence as the task permits both efficiently and effectively. This includes the ability to skip non-required task steps, return to revise earlier tasks steps, be informed as to which task steps are not changeable once completed. This is particularly dependent when the task is non-linear (i.e. future task steps sometimes depend on prior task steps).

Furthermore, there is a need in the art for a task oriented interface that provides the user with more options for controlling a series of task steps.

SUMMARY OF THE INVENTION

The aforementioned needs are addressed by the present invention. Accordingly, there is provided, in a first form, a data processing system for performing a step-by-step procedure using a task oriented interface integrated into a single, intuitive, graphical control/display that further controls the user's ability to navigate through the steps and prevents the user from attempting to revise irreversible steps. The interface display graphically displays how many steps remain to be completed, and how many steps have already been completed. Moreover, it enables the user to deviate from the predefined order of steps and skip optional steps while compelling the user to complete the required steps. The display also differentially displays the completed steps to indicate which steps can be revised and which cannot.

There is also provided, in a second form, a method for performing the step-by-step procedure using the task oriented interface of the data processing system.

Additionally, there is provided, in a third form, a computer program product operable for storage on program storage media, wherein the program product is operable for performing the step-by-step procedure using the task oriented interface of the data processing system.

The use of such system, method, and apparatus also has the advantage over prior art interfaces of implementing in a control that is highly efficient in terms of space upon the display screen and thus a large amount of the display remains operable for use for text and graphics for the user when completing each task step.

The present invention further adds additional controls, represented by controls (i.e. buttons), that represent the series of steps necessary to complete the task. When the task steps is a linear sequence with a single path, these controls represent the steps in that path. Where the task has branches, the steps indicate one sequence (such as the shortest possible sequence) through the remaining steps in the task. The number of steps optionally may be updated dynamically if the user takes a branch with more or fewer steps remaining.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
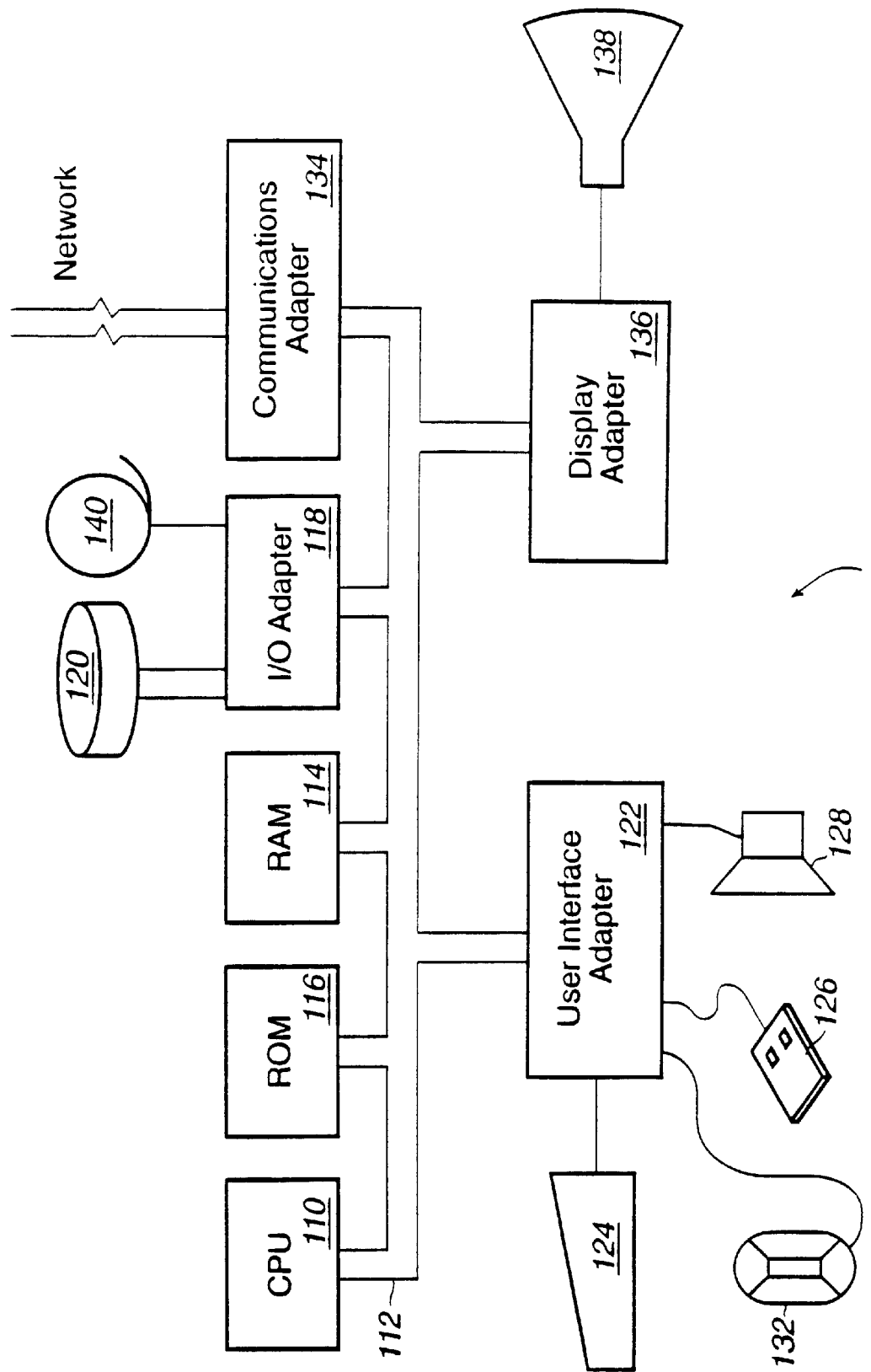
FIG. 1 illustrates, in block diagram form, a data processing system in accordance with an embodiment of the present invention.

The present invention provides navigational controls for a task orientation interface in a GUI system. In the following description, numerous specific details are set forth to provide a thorough understanding of the present invention. For clarity, the task orientation interface of the present invention may be described in the context of the Wizards and TaskGuides task orientation interfaces. However, it will be obvious to those skilled in the art that the present invention may be practiced without such specific details. In particular, the present invention may be practiced for other task orientation interfaces in addition to Wizards or TaskGuides. In other instances, well-known materials have been shown in block diagram form in order not to obscure the present invention in unnecessary detail.

Refer now to the drawings wherein depicted elements are not necessarily shown to scale and wherein like or similar elements are designated by the same reference numeral through the several views.

Referring first to FIG. 1, an example is shown of a data processing system 100 which may be used for the invention. The system has a central processing unit (CPU) 110. The task orientation interface of the present invention may be generated by CPU 110 for display on display 138. The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Alternatively, garbage collection instrumentation of the present invention may be included in RAM 114. Communications adapter 134 interconnects bus 112 with an outside network enabling the data processing system to communication with other such systems. Input/Output devices are also connected to system bus 112 via user interface adapter 122 and display adapter 136. Keyboard 124, track ball 132, mouse 126 and speaker 128 are all interconnected to bus 112 via user interface adapter 122. Display monitor 138 is connected to system bus 112 by display adapter 136. In this manner, a user is capable of inputting to the system throughout the keyboard 124, trackball 132 or mouse 126 and receiving output from the system via speaker 128 and display 138. Additionally, an operating system is used to coordinate the functions of the various components shown in FIG. 1.

Preferred implementations of the invention include implementations as a computer system programmed to execute the method or methods described herein, and as a computer program product. According to the computer system implementation, sets of instructions for executing the method or methods are resident in the random access memory 114 of one or more computer systems configured generally as described above. Until required by the computer system, the set of instructions may be stored as a computer program product in another computer memory, for example, in disk drive 120 (which may include a removable memory such as an optical disk or floppy disk for eventual use in the disk drive 120). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Figure 2:
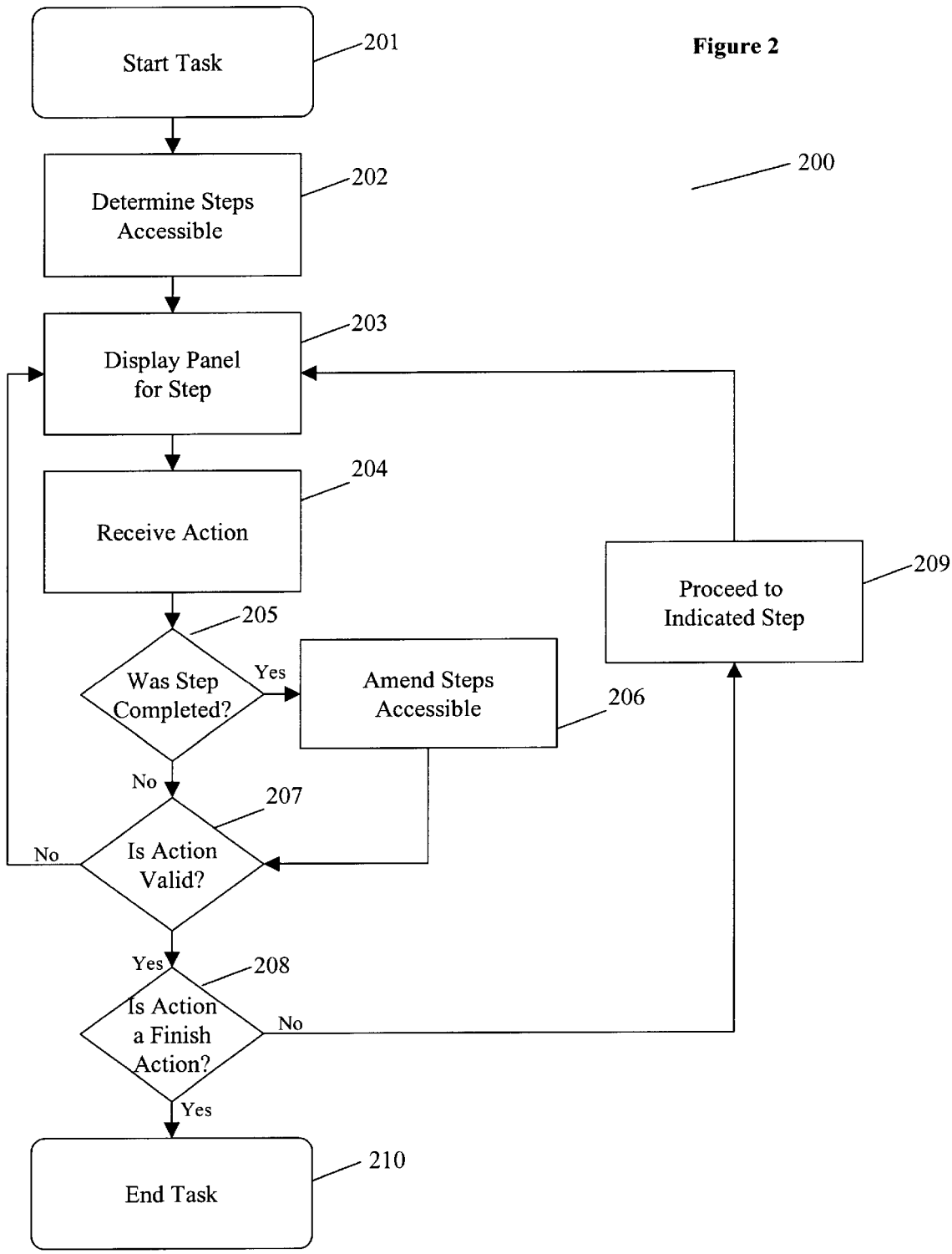
FIG. 2 illustrates, in flowchart form, a method of a task orientation interface in accordance with an embodiment of the present invention.

Refer now to FIG. 2, in which is illustrated the task orientation interface method 200 according to the present invention. The initiation of the task steps occurs in step 201, and the status of the task steps are determined in step 202. The status of a task step may be whether that task step is presently "accessible" or "enabled" for the user. Optionally, all of the task steps may be initially set to be accessible to the user. A task step is accessible or enabled if the user can then access that task step (i.e. the user can access that task step by selecting (or indicating) so by utilizing the control (such as the button) corresponding to that task step). The status of the task steps may be whether that task step is "required" in order to proceed to a further task step or whether the task step is "required" to complete the task. The status of the task steps may also be whether that task step is "reversible" (i.e., the task step can be changed once that task step is completed).

Figure 3:
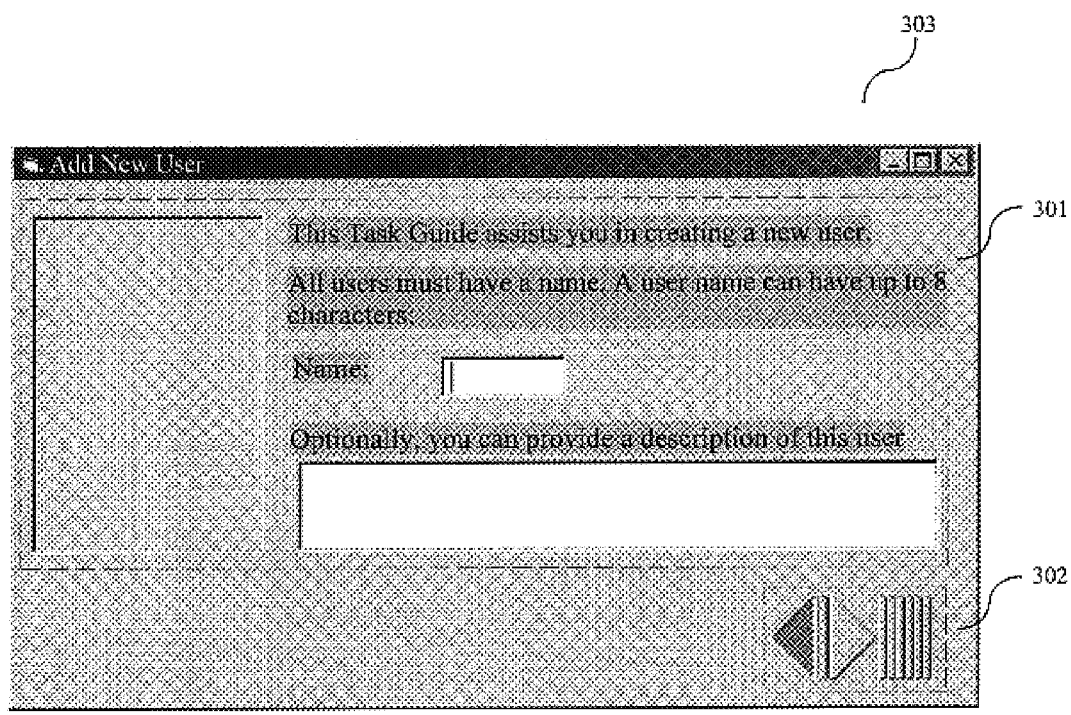
FIG. 3 illustrates, in a screen display form, how an embodiment of the present invention would appear to the user on the screen display.

Furthermore, a panel 303 corresponding to the initial step, such as illustrated in FIG. 3, is displayed in step 203. As shown in FIG. 3, the dialog 301 of panel 303 prompts the user to supply information for the panel to complete the task step. (For instance, in the example in FIG. 3, this would be the user's name). The information may be necessary or optional, again as reflected on FIG. 3. As described in further detail below, a portion of FIG. 3 illustrates the controls 302 of the task orientation interface as a series of controls (such as buttons), which controls 302 appear in the lower right portion of FIG. 3. Optionally, a text description of the task step (used to assist the user to understand the task step, i.e. for "bubble help" or "hover help") can be used to identify the task step when the user inputs into the system such as through the keyboard 124, trackball 132, or mouse 126. (For instance, by positioning the user's mouse 126 cursor over the control).

The panel 301 displayed in step 203 further prompts the user to supply the task step the user desires to proceed to next. The controls for those task steps that are not then enabled by the user, generally are set such that the user may not select this task step to be proceeded to next. Upon the user selecting the task step to proceed to next, the information is transmitted by the user and received in step 204. From the information received in step 204, the determination is made in step 205 whether that information completes that task step. A task step is completed when the information received in step 204 includes the necessary (or requisite) information from the user.

If the task step is completed, the status of the task steps are amended in step 206 to reflect any resultant changes. For instance, if a task step is not reversible, upon completion of that task step, its status would be changed to be disabled. Moreover, if later task steps were not enabled unless and until the completion of the task step just completed, the status of these other task steps may be change to enabled.

After changing the status of the tasks steps in step 206, the determination is made in step 207 whether the user has selected to proceed to an enabled task step. This same determination at step 207 is made even when the prior task step was not completed. If the task step selected by the user to go to next is not enabled, the display of step 203 continues to be displayed. Optionally, a prompt may be given to the user to request the necessary information, which prompt may include what necessary information has not been input by the user. Also optionally, a prompt may be given indicating that the next task step is not enabled for that user. If the information received in step 204 is for atask step that may not then be performed, the display of step 203 continues until a proper prompt is received.

If the prompt to the system received in step 204 is for a task step that is enabled, a determination is made in step 208 whether the task step indicates the task is completed (i.e. a finish action from the user). The finish action is defined as the last task step for completing the task. Generally, a finish action is only enabled when all of the steps necessary to complete the task have been completed. Alternatively, the finish action may be set to terminate the task prior to completion. Such an alternative embodiment is disclosed in FIG. 8, as further discussed below. If the information received in step 204 indicates the action is finished, the method is ended at step 210. Otherwise, in step 209, the task is continued by performing the task step selected by the user. The display panel for this task step is then displayed in step 203 and the process repeats until the final action is determined by step 208.

Figure 8:
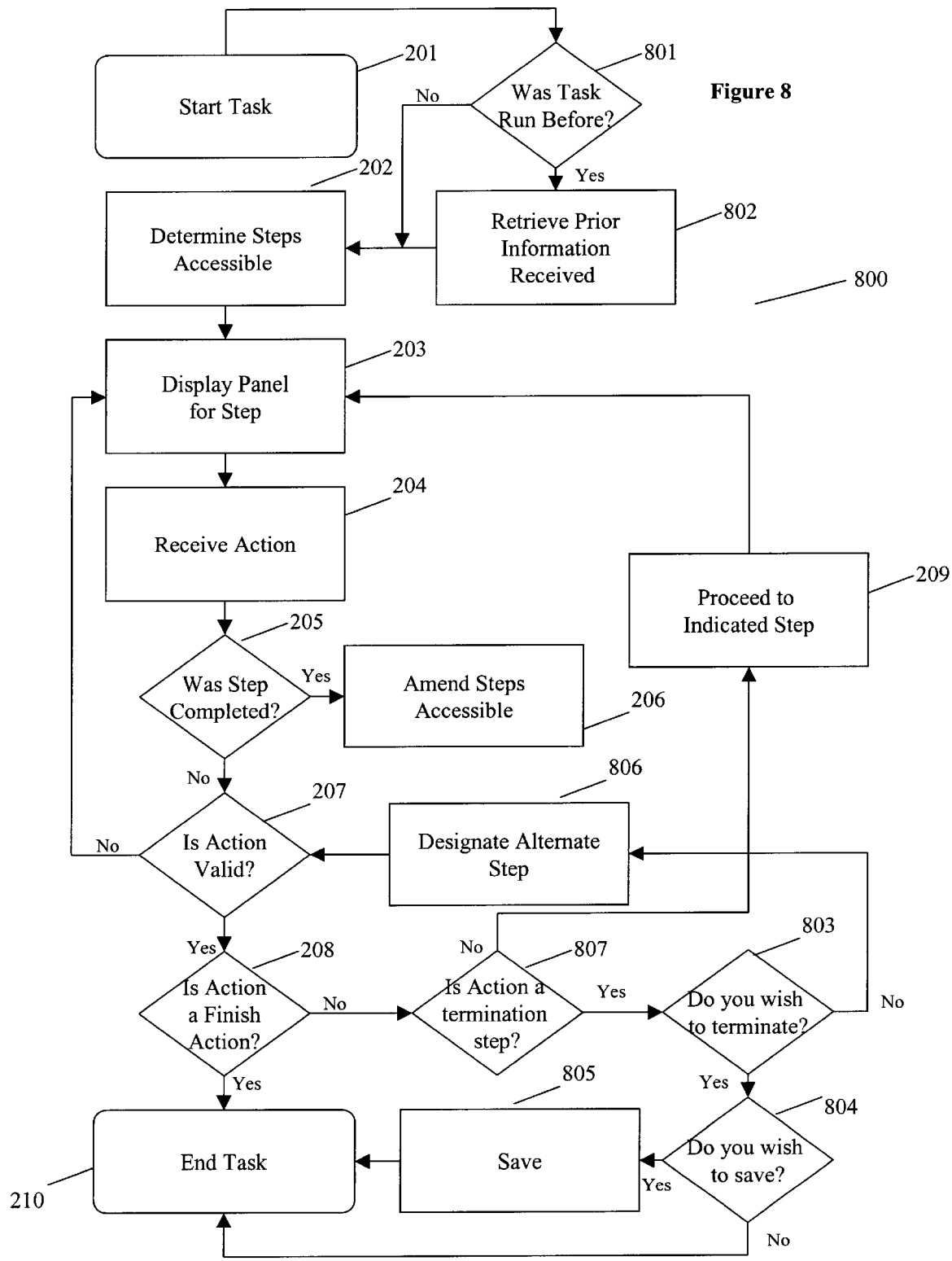
FIG. 8 illustrates, in flowchart form, a method of a task orientation interface in accordance with an alternative embodiment of the present invention.

For FIG. 8, the same general method is performed except that upon initiation of the task, a step 801 is performed to determine whether the task has been started before by that user (and ended before completion of the task). If such circumstance has not occurred, the task steps are performed beginning at the initial task step similar to the initial task step disclosed for FIG. 2. If, however, the task has been started but not completed for that user on a prior occasion, the saved steps previously performed are retrieved and the task proceeds at step 202 with the status of the task steps set for the retrieved, but uncompleted, task.

Furthermore, when terminating prior to completion as identified in step 807, verification is made whether the user truly wants to terminate the task before completion. If the user fails to verify that termination is desired, user may select in step 806 an alternative task step to proceed. The determination is then made in step 207 whether this alternative task step is valid and the steps of the present invention continues as reflected in FIG. 2. If, however, the user verifies termination, the determination is made in step 804 whether to save the input received during partial completion of the task. If so selected, the input is saved in step 805. Regardless of whether the input is saved, the task is ended at step 210.

Figure 4:
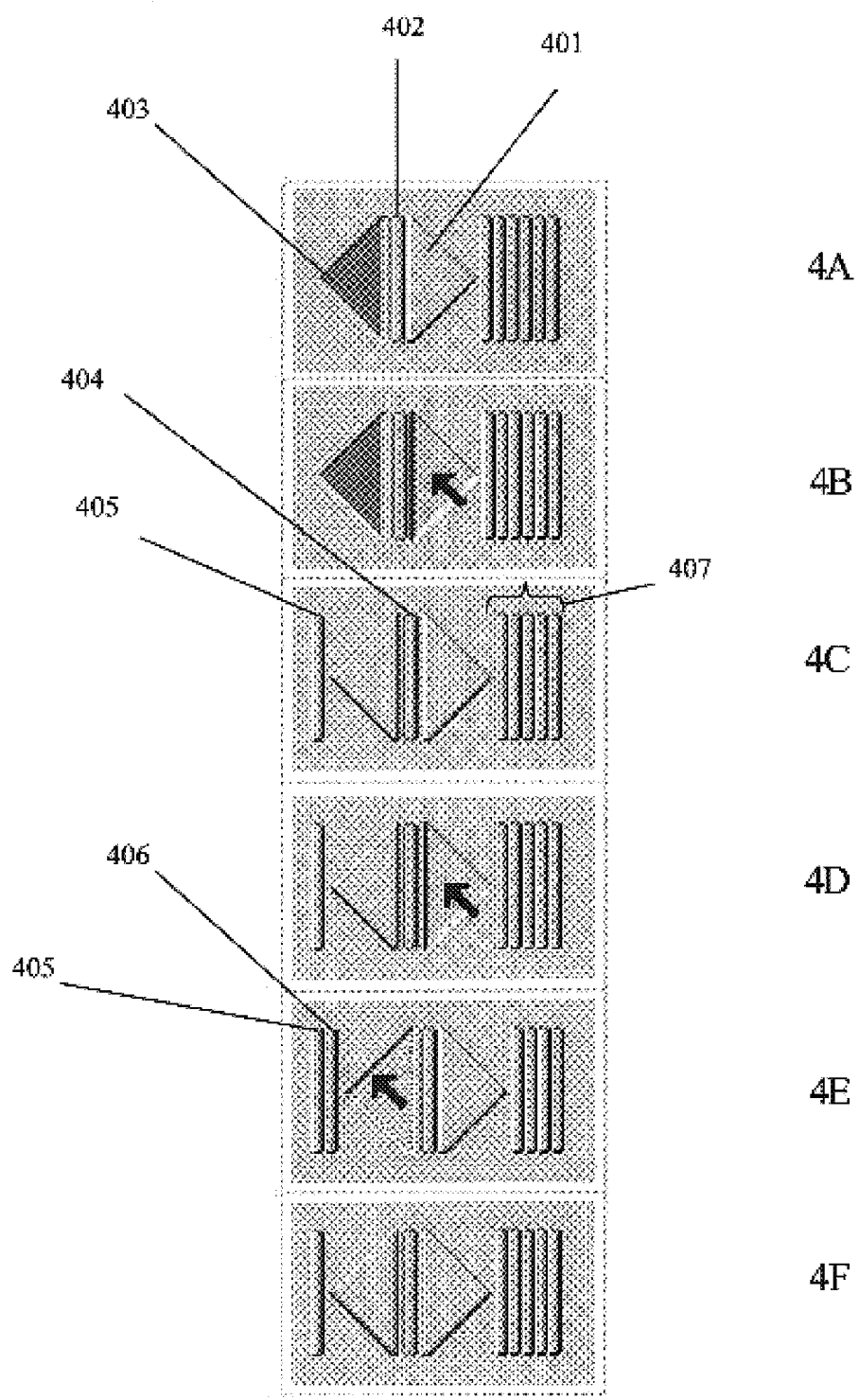
FIG. 4 illustrates, in a screen display form, a sequence of detailed views of the controls portion of FIG. 3, in accordance with the present invention.

Refer now to FIG. 4, which is a sequence of detailed views of the controls portion of FIG. 3, in accordance with the present invention. When the task is initiated, the controls shown in FIG. 4A are displayed on monitor 138. In the controls illustrated in FIG. 4A, the control (bar) 402 between the left facing triangle 403 and the right facing triangle 401 represents the current task panel that is being displayed. The right facing triangle 401 causes the dialog to advance to the next step and is sometimes referred to as the "Forward Control" or "Next Control." The left facing triangle 403 causes the dialog to backup to the previous completed step and is sometimes referred to as the "Back Control." As shown in FIG. 4A, when no prior step exists or is enabled, the Back Control 403 is disabled.

After the user supplies the necessary information on the first panel, the user would indicate completion, such as by "pressing" the Forward Control 401, as shown in FIG. 4B. If the information received is validated, the second task panel is displayed as shown in FIG. 4C and an control 405 (referred to as the "completed first control") appears to the left of the Back Control 403. Control 405 represents the same task panel that was displayed when control 402 was between the Back Control 403 and Forward Control 401 in FIG. 4A. (Accordingly, control 402 of FIG. 4A and control 405 of FIG. 4C are the same control, which has moved from one position to another). Because the user may now backup to review or revise the first step (provided that option is given), the Back Control 403 is now enabled. The control 404 between the Back Control 403 and the Forward Control 401 in FIG. 4C represents the current task step. The set of bars 407 to the right of the Forward Control 401 in FIG. 4C are representative of the task steps remaining in the task.

FIG. 4D reflects the user advancing by pressing the Forward Control 401. FIG. 4E illustrates the controls that would appear if the second task step was properly completed. Because two tasks were completed, a second control (control 406) now appears to the left of the Back Control 403. (Similar as to stated above, control 404 of FIG. 4C and control 406 of FIG. 4E are the same control, which has moved from one position to another). By selecting the Back Control 403, as shown in FIG. 4E, the controls appear as reflected in FIG. 4F, which are similar to how the controls appeared in FIG. 4C. The panel displayed in FIG. 4F generally would be the same panel as was displayed when FIG. 4C appeared. Generally, the information the user has previously input would also be reflected on this panel upon return.

Figure 5:
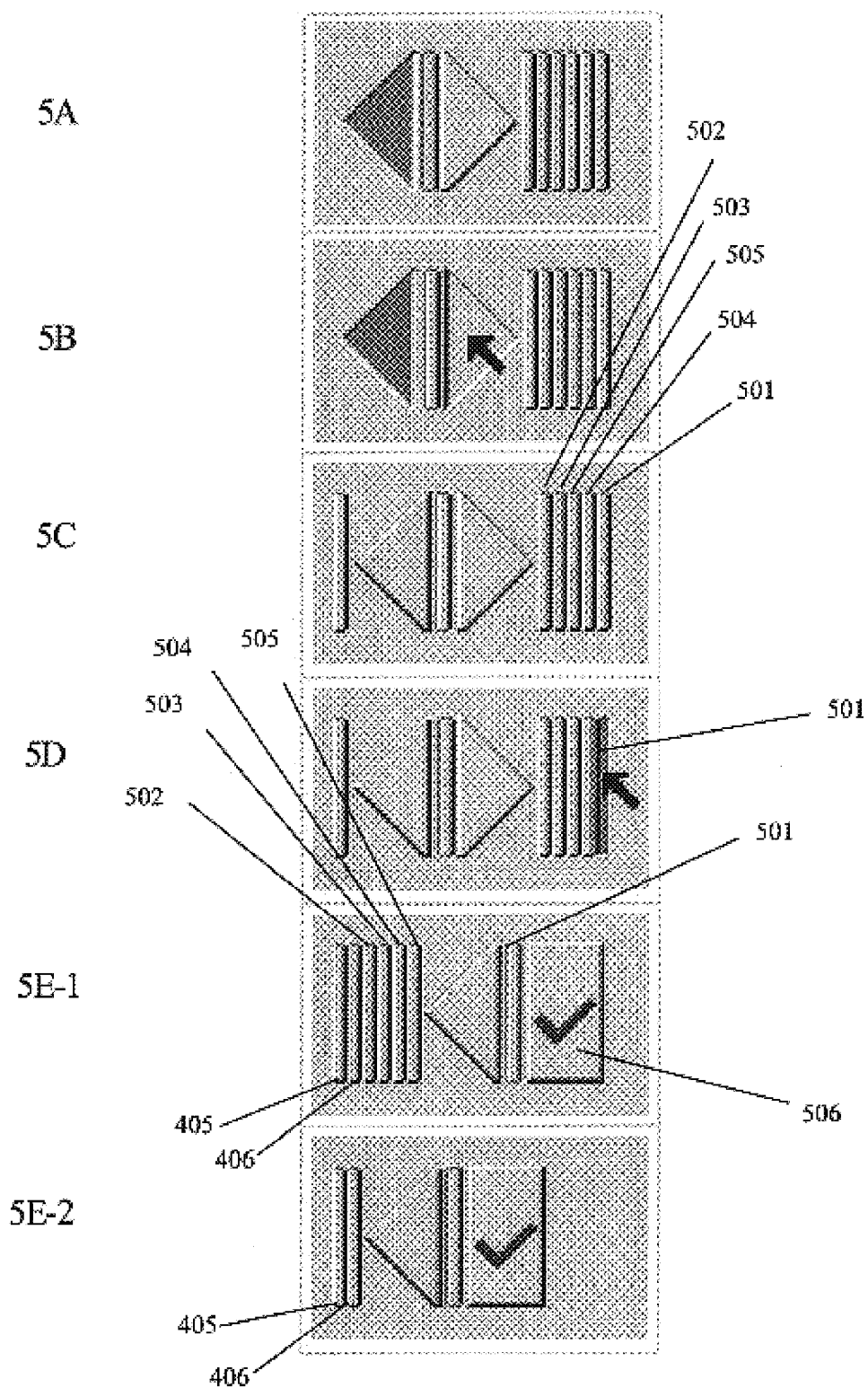
FIG. 5 illustrates, in a screen display form, a sequence of detailed views of the controls portion of FIG. 3, in accordance with a first alternative embodiment of the present invention.

Refer now to FIG. 5, which is a sequence of detailed views of the controls portion of FIG. 3, in accordance with a first alternative embodiment of the present invention. This sequence illustrates how the controls may be used to skip steps and deviate from a strict step-by-step sequence.

In FIGS. 5A–5C, the user completes the first steps and the controls indicate the completion of the steps similar as to described above for FIGS. 4A–4C. As shown in FIG. 5D, the user may then, if the user elects, select the right-most bar (control 501), which selects the completion step in the task step. The dialog panel for this final task step (associated with control 501) is presented, and, as shown in FIG. 5E-1, the Forward Control is replaced with a Finished Control 506. The remainder of the task step controls 502–505 are now located on the left of the Back Control 403. FIG. 5E-1 accordingly reflects all of the task steps of the controls, including those tasks that were skipped (associated with controls 502–505). Alternatively, and as shown in FIG. 5E-2, only the two steps that were completed by the user (associated with controls 405 and 406) are displayed.

Figure 6:
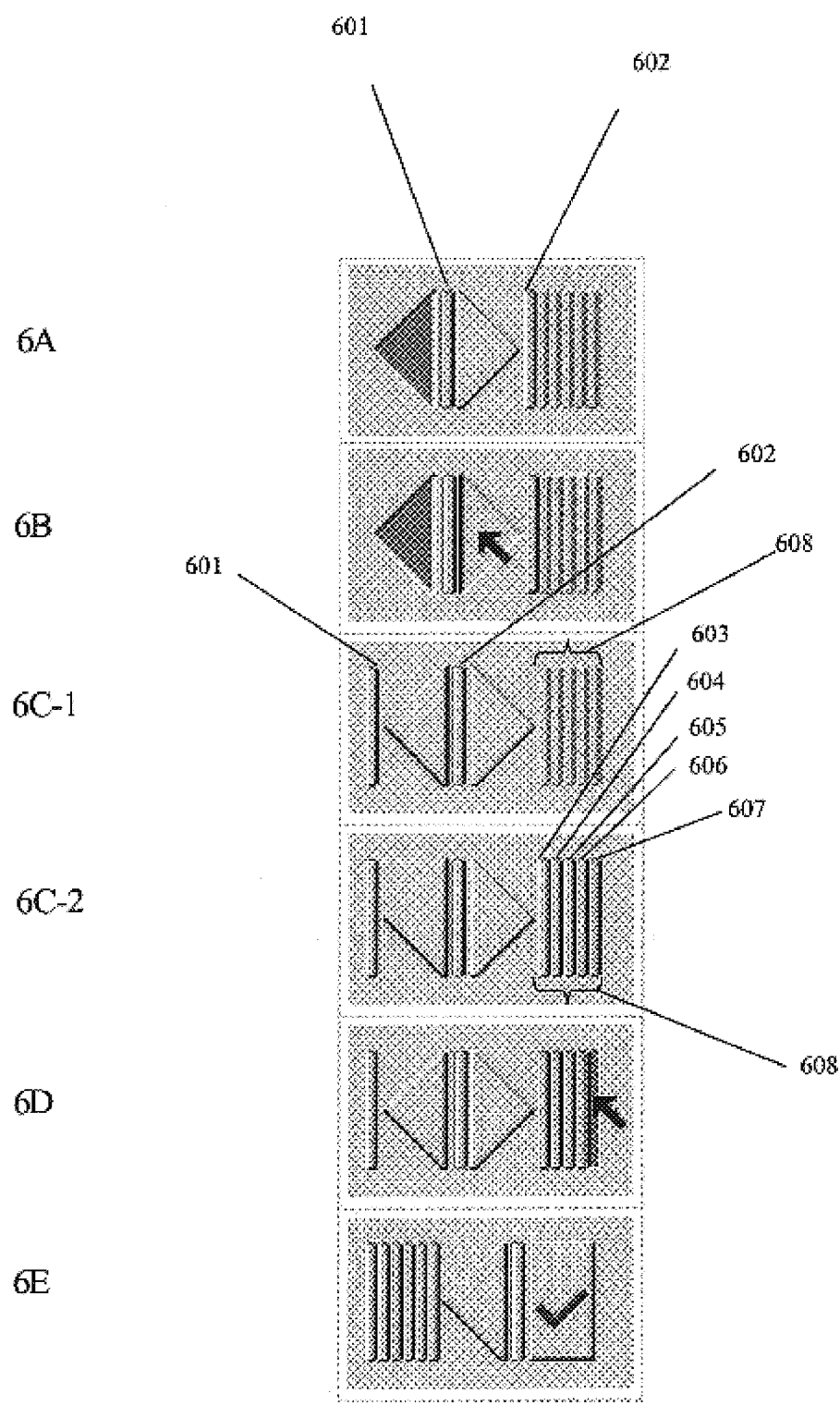
FIG. 6 illustrates, in a screen display form, a sequence of detailed views of the controls portion of FIG. 3, in accordance with a second alternative embodiment of the present invention.

Refer now to FIG. 6, which is a sequence of detailed views of the controls portion of FIG. 3, in accordance with a second alternative embodiment of the present invention. This sequence illustrates how the controls may be used to select and control the execution of required and optional steps in the task. For this process, the first two steps associated with controls 601 and 602 are required. Accordingly, these two steps are initially enabled and the tasks steps associated with controls 603–607 (collectively set of controls 608) are disabled (shadowed) so that the user cannot advance to any of the tasks steps associated with the set of controls 608 unless the first two steps (associated with controls 601 and 602) are completed. In FIGS. 6A, 6B, and 6C-1, the user completes the first steps and the control indicates the completion of the steps similar as to described above for FIGS. 4A–4C. For instance, if the user attempts to select control 607 before the completion of the first two steps (associated with controls 601 and 602), the display will not advance to the task step associated with control 607.

After the necessary information on the second panel has been supplied by the user, the remaining task steps (associated with controls 603–607) are enabled, as shown in FIG. 6C-2. FIGS. 6D and 6E illustrate how the controls operate after the steps associated with controls 601 and 602 are performed. This performance is similar to that shown in FIGS. 5D and 5E-1.

Figure 7:
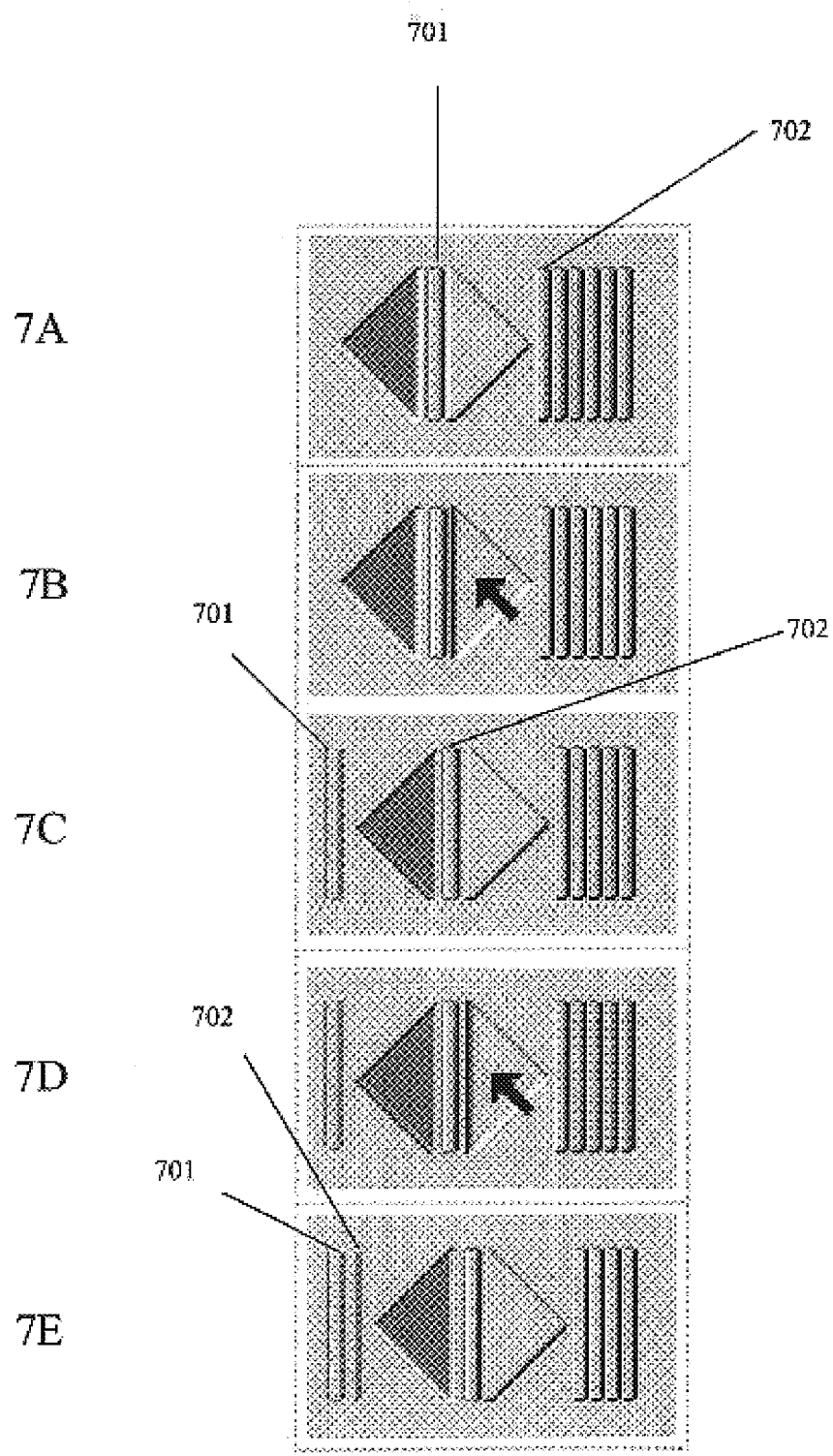
FIG. 7 illustrates, in a screen display form, a sequence of detailed views of the controls portion of FIG. 3, in accordance with a third alternative embodiment of the present invention.

Refer now to FIG. 7, which is a sequence of detailed views of the control portion of FIG. 3, in accordance with a third alternative embodiment of the present invention. This sequence illustrates how the control may be used to indicate irreversible steps. For this process, after the first two steps (associated with controls 701 and 702 are performed) these steps are irretrievable. In FIGS. 7A–7D, the user completes the first two steps and the control indicates the completion of the steps similar as described above for FIGS. 4A–4D. However, once these two steps (associated with controls 701 and 702 are preformed), the controls 701 and 702 and the Back Control 403 are disabled.

As noted above, the controls can include "bubble" or "hover" help to identify the task steps as well as the Back Control and Forward Control. The bubble or hover help could further include additional information to describe that a particular step is irreversible, required, etc.

As noted above, in step 202, the status of each of the task steps must be determined and in step 206, the status must be amended. One methodology of doing this is to set up the matrix reflected below in Table 1.

TABLE 1

| Index | Name of Step | Reversible | Required | Enabled | Completed | Pointer to Panel |
|---|---|---|---|---|---|---|
| 1 | | True | True | True | False | |
| 2 | | True | True | False | False | |
| 3 | | True | False | False | False | |
| 4 | | True | False | False | False | |
| 5 | | True | False | False | False | |
| 6 | | True | False | False | False | |
| 7 | | True | False | False | False | |

The "name of step" is the text description of the step, which can be used for "bubble" or "hover" help to identify the task step when the users request such help (such as by holding the mouse 126 over that control associated with that task step).

If a task step is "reversible," its boolean value is set as true. Otherwise, the boolean value is set as false for that task step.

If a task step is "required" to be performed before continuing to subsequent steps, the boolean value is set as true for that task step. Otherwise, the boolean value is set as false for that task step. Once a required step has been completed, the boolean value is changed to false.

If a task step is "enabled," the boolean value is set as true If the task step is not enabled, the boolean value is set as false.

All boolean values for "completed" task steps are initially set as false. Once a task step is completed, the boolean value is set as true.

The "pointer to panel" is the designation that would reflect what panel to display when that step is current.

The matrix of Table 1 parallels the sequence of controls utilized in FIG. 6 to select and control the execution of required and optional steps in the task. For that process, the first two steps are required.

When a task orientation interface (such as "Wizards") is started, the array is scanned and a task control can be generated to the right of the Forward Control 401 for steps 2 to the final step of the task. (Such as shown in FIG. 6A). The first step may be represented by the control 601 between the Forward Control 401 and the Back Control 403. As shown in FIG. 6A, the Back Control is initially set as disabled indicating the user cannot back up. The Forward Control is initially set to be "enabled," indicating the user can advance forward. The "completed" values as specified in Table 1 start as false. The "required" value of each step is scanned with step 1 and proceeding to the final step. When the first "required" value that equals true is encountered, the enabled value of all subsequent task steps is set to be false. Accordingly, since the first step has a "required" value equal to true, the enabled value of all subsequent tasks steps (2–7) are set as false.

A variable is then used to track the current step panel being displayed. This variable may be initially set for the "index" to be equal to 1.

If the user then completes task step 1 and indicates using the Forward Control (as shown in FIG. 6B), the completed value of the first task step is now changed to being set as true. Furthermore, because the first task has been completed, it is no longer a required task step, and thus, the required value is now set as false. And because the required value is now false, the enabled value for task step 2 is now set as true. (The enabled values for the remaining task steps 3–7 remain set as false because step 2 is itself a required task step). Moreover, had task step 1 been irreversible (which in Table 1, it is not), the enabled value of task step 1 would have been changed to false. The variable would then be incremented and the controls redrawn as shown in FIG. 6C-1, which reflects the Back Control now enabled.

Table 1 would now be modified to the matrix as reflected below In Table 2.

TABLE 2

| Index | Name of Step | Reversible | Required | Enabled | Completed | Pointer to Panel |
|---|---|---|---|---|---|---|
| 1 | | True | False | True | True | |
| 2 | | True | True | True | False | |
| 3 | | True | False | False | False | |
| 4 | | True | False | False | False | |
| 5 | | True | False | False | False | |
| 6 | | True | False | False | False | |
| 7 | | True | False | False | False | |

Repeating this process for the completion of task step 2 causes Table 2 to be modified as the matrix reflected below In Table 3.

TABLE 3

| Index | Name of Step | Reversible | Required | Enabled | Completed | Pointer to Panel |
|---|---|---|---|---|---|---|
| 1 | | True | False | True | True | |
| 2 | | True | False | True | True | |
| 3 | | True | False | True | False | |

TABLE 3-continued

| Index | Name of Step | Reversible | Required | Enabled | Completed | Pointer to Panel |
|---|---|---|---|---|---|---|
| 4 | | True | False | True | False | |
| 5 | | True | False | True | False | |
| 6 | | True | False | True | False | |
| 7 | | True | False | True | False | |

Because all of the required task steps have now been complete (and there are no irreversible steps) all of the task steps are now enabled. Accordingly, and as shown in FIG. 6D, the user may then, if it elects, select the right-most bar (control 607), which indicates the final completion task step in the task.

Although the present invention and its advantages have been described in detail, it should be understood that various changes, substitutions and alterations can be made herein without departing from the spirit and scope of the invention as defined by the appended claims.

What is claimed is:

1. A method for performing task navigation comprising the steps of
   (a) receiving a first control signal for initiating a task to be performed, which task comprises a sequence of a plurality of task steps,
   (b) displaying a first plurality of controls representative of a first set of the plurality of task steps, wherein the first plurality of controls represent a sequence of the first set of the plurality of task steps;
   (c) receiving a second control signal selecting a first control of the first plurality of controls; and
   (d) displaying a second plurality of controls representative of a second set of the plurality of task steps generated in response to the second control signal, wherein the second plurality of controls represents a sequence of the second set of the plurality of the task steps.

2. The method of claim 1 wherein said first control indicates a first task step to be completed out of sequence of the sequence of the first set of the plurality of task steps.

3. The method of claim 1 wherein the second control signal can be received provided the first control is enabled for selection.

4. The method of claim 1 further comprising the step of receiving a third control signal for completing a first task step, wherein said display of the second plurality of controls is generated in response to the third control signal.

5. The method of claim 4 wherein said step of completing said first task step enables at least one control of the plurality of controls for selection.

6. The method of claim 4 wherein said step of completing said first task disables at least one control for selection.

7. The method of claim 6 wherein said step of completing said first task disables the control representing the first task for selection.

8. The method of claim 4 wherein said step of completing said first task is required to perform the task.

9. A method for generating task navigation controls for a task orientation interface comprising the steps of:
   (a) determining a plurality of task steps for a task;
   (b) sequencing a first set of task steps of the plurality of the task steps;
   (c) generating a first set of controls that represent a sequence of the first set of task steps;
   (d) receiving information upon selection of a first control in said first set of controls;
   (e) sequencing a second set of task steps of the plurality of the task steps in response to said information; and
   (f) generating a second set of controls that represent the sequence of a second set of task steps.

10. The method of claim 9 wherein
   (a) said step of generating the first set of controls comprises determining a first status for each of the first set of task steps
   (b) said step of generating the second set of controls comprises determining a second status for each of the second set of task steps.

11. The method of claim 10 wherein the status of the tasks steps is selected from the group consisting of:
   (a) reversibility;
   (b) requirability,
   (c) enablement; and
   (d) completion.

12. The method of claim 10 wherein the status of the tasks steps comprises:
   (a) reversibility;
   (b) requirability;
   (c) enablement, and
   (d) completion.

13. The method of claim 10 further comprising the step of disabling an control, wherein the control represents a first task step whose status is determined to be disabled.

14. The method of claim 10 wherein said information completes a first task step in the plurality of task steps.

15. The method of claim 14 further comprising the step of disabling an control in response to completing the first task step.

16. The method of claim 14 further comprising the step of disabling an control representing the first task step when the status of the task step is determined to be not reversible.

17. The method of claim 14 further comprising the step of enabling an control for a second task step in response to completing the first task step.

18. The method of claim 9 further comprising the steps of:
   displaying the first set of controls in the first sequence; and
   displaying the second set of controls in the second sequence.

19. The method of claim 9 further comprising the steps of:
   displaying controls representing enabled tasks steps in a first form;
   displaying controls representing disabled tasks in a second form.

20. A data processing system for generating task navigation controls for a task orientation interface comprising circuitry operable for the generating task navigation controls, wherein said circuitry operable for the generating task navigation controls further comprises:
   (a) circuitry operable for determining a plurality of task steps for a task;
   (b) circuitry operable for sequencing a first set of task steps of the plurality of the task steps,
   (c) circuitry operable for generating a first set of controls that represent a sequence of the first set of task steps;
   (d) circuitry operable for receiving information upon selection of a first control in said first set of controls;
   (e) circuitry operable for sequencing a second set of task steps of the plurality of the task steps in response to said information; and (f) circuitry operable for generating a second set of controls that represent a sequence of the second set of task steps.

21. The data processing system of claim 20 wherein
   (a) said circuitry operable for generating the first set of controls comprises circuitry operable for determining a first status for each of the first set of task steps, and
   (b) said circuitry operable for generating the second set of controls comprises circuitry operable for determining a second status for each of the second set of task steps.

22. The data processing system of claim 21 wherein the status of the tasks steps is selected from the group consisting of:
   (a) reversibility;
   (b) requirability;
   (c) enablement; and
   (d) completion.

23. The data processing system of claim 21 wherein the status of the tasks steps comprises:
   (a) reversibility,
   (b) requirability;
   (c) enablement, and
   (d) completion.

24. The data processing system of claim 21 further comprising circuitry operable for disabling an control, wherein the control represents a first task step whose status is determined to be disabled.

25. The data processing system of claim 21 wherein said information completes a first task step in the plurality of task steps.

26. The data processing system of claim 25 further comprising circuitry operable for disabling an control in response to completing the first task step.

27. The data processing system of claim 25 further comprising circuitry operable for disabling an control representing the first task step when the status of the task step is determined to be not reversible.

28. The data processing system of claim 25 further comprising circuitry operable for enabling an control for a second task step in response to completing the first task step.

29. A program storage device readable by a machine, tangibly embodying a program of instructions executable by the machine to perform method steps for generating task navigation controls for a task orientation interface, said method steps comprising:
   (a) determining a plurality of task steps for a task;
   (b) sequencing a first set of task steps of the plurality of the task steps;
   (c) generating a first set of controls that represent the sequence of a first set of task steps;
   (d) receiving information upon selection of a first control in said first set of controls;
   (e) sequencing a second set of task steps of the plurality of the task steps in response to said information; and
   (f) generating a second set of controls that represent a sequence of the second set of task steps.

30. The program storage device of claim 29 wherein
   (a) said method step of generating the first set of controls comprises determining a first status for each of the first set of task steps, and
   (b) said method step of generating the second set of controls comprises determining a second status for each of the second set of task steps.

31. The program storage device of claim 30 wherein the status of the tasks steps is selected from the group consisting of:
   (a) reversibility;
   (b) requirability;
   (c) enablement; and
   (d) completion.

32. The program storage device of claim 30 wherein the status of the tasks steps comprises:
   (a) reversibility;
   (b) requirability,
   (c) enablement; and
   (d) completion.

33. The program storage device of claim 30 wherein the method steps further comprise the method step of disabling an control, wherein the control represents a first task step whose status is determined to be disabled.

34. The program storage device of claim 30 wherein said information completes a first task step in the plurality of task steps.

35. The program storage device of claim 34 wherein the method steps further comprise disabling an control in response to completing the first task step.

36. The program storage device of claim 34 wherein the method steps further comprise disabling an control representing the first task step when the status of the task step is determined to be not reversible.

37. The program storage device of claim 34 wherein the method steps further comprise enabling an control for a second task step in response to completing the first task step.

38. A graphical user interface comprising:
   (a) a plurality of task controls each representing a task step in a sequence of task steps;
   (b) a forward control operable for permitting a user to proceed through the sequence of task steps, and
   (c) a backward control operable for permitting the user to reverse through the sequence of task steps, wherein
   a status for each of the task controls is determined, and
   each of said task controls is operable based upon the status determined for the task control.

39. The graphical user interface of claim 38 wherein the status for each of the task controls is selected from the group consisting of:
   (a) reversibility,
   (b) requirability;
   (c) enablement; and
   (d) completion.

40. The graphical user interface of claim 38 wherein the status for each of the task controls comprises:
   (a) reversibility;
   (b) requirability;
   (c) enablement; and
   (d) completion.

41. The graphical user interface of claim 38 wherein a first control of the plurality of task controls is:
   operable for moving between a first position and a second position;
   operable for moving between the second position and a third position; and
   operable for moving between the first position and a third position, wherein
   said first position indicates a first task step represented by the first control occurring later in the sequence of task steps,
   said second position indicates a first task step currently occurring in the sequence of task steps, and said third position indicates a first task step occurring earlier in the sequence of task steps.

42. The graphical user interface of claim 38 wherein a first task control of the plurality of task controls representing a first task step is between the forward control and the back control, wherein the first task step is the current task step.

43. The graphical user interface of claim 42 wherein the first task control moves next to the backward control upon completion of the first task step.

44. The graphical user interface of claim 42 wherein the first task control moves next to the backward control upon selection of the forward control.

45. The graphical user interface of claim 42 wherein the first task control moves next to the forward control upon selection of the backward control.

46. The graphical user interface of claim 38 wherein a first set of task steps in the sequence of the task steps are skipped upon selection of a first control representing a task step occurring later in the sequence of the task steps than the first set of task steps.

47. The graphical user interface of claim 46 wherein a second plurality of task controls each representing the first set of task steps moves next to the backward control upon selection of the first control.

48. The graphical user interface of claim 46 wherein the first control is operable for selection provided the status of the first control is enabled.

49. The graphical user interface of claim 38 wherein a first set of task steps in the sequence of the task steps are skipped upon selection of a first control representing a task step occurring earlier in the sequence of the task steps than the first set of task steps.

50. The graphical user interface of claim 49 wherein a second plurality of task controls each representing the first set of task steps moves next to the forward control upon selection of the first control.

51. The graphical user interface of claim 49 wherein the first control is operable for selection provided the status of the first control is reversible.

* * * * *

UNITED STATES PATENT AND TRADEMARK OFFICE
CERTIFICATE OF CORRECTION

PATENT NO. : 6,904,565 B1
DATED : June 7, 2005
INVENTOR(S) : James Lee Lentz

It is certified that error appears in the above-identified patent and that said Letters Patent is hereby corrected as shown below:

<u>Column 9,</u>
Line 28, replace "," with -- ; --.

Signed and Sealed this

Twenty-third Day of May, 2006

JON W. DUDAS
*Director of the United States Patent and Trademark Office*